3,068,200
NITROGENOUS ADDITION POLYMERS OF PROPIOLATES

John M. Butler and Lee A. Miller, Dayton, and George L. Wesp, Englewood, Ohio, assignors to Monsanto Chemical Company, St. Louis, Mo., a corporation of Delaware
No Drawing. Filed Sept. 9, 1960, Ser. No. 54,819
21 Claims. (Cl. 260—47)

This invention relates to synthetic resins and more particularly provides nitrogenous addition polymers which contain a plurality of olefinic double bonds and ester and heterocyclic nitrogen moieties, which polymers are useful in the plastics, coatings, adhesives and laminate industries. The invention also provides a method of preparing the new polymers by the addition polymerization of certain acetylenic diesters and certain heterocyclic nitrogen compounds. Further aspects of the invention are the provision of new and valuable cross-linked copolymers of the olefinic addition polymers and the provision of a method of preparing such cross-linked polymers by reaction of the olefinic addition polymers with a compound containing a vinyl group and copolymerizable with the olefinic polymers.

In the copending application Serial No. 38,113, filed June 23, 1960, of Lee A. Miller and John M. Butler, there are disclosed and claimed the diesters of certain diols and certain acetylenic acids, i.e., compounds of the formula $$ZC{\equiv}C\overset{O}{\overset{\|}{C}}ORO\overset{O}{\overset{\|}{C}}C{\equiv}CZ$$

in which Z is selected from the class consisting of hydrogen, alkyl radicals of from 1 to 5 carbon atoms and aryl radicals of 6 to 10 carbon atoms and R is selected from the class consisting of bivalent hydrocarbon radicals of from 2 to 18 carbon atoms and such radicals carrying halogen substitution and which is linked through diverse carbon atoms thereof to the remainder of the molecule of which it forms a part. Now we have found that said diesters are eminently suited to the manufacture of high molecular weight, polymeric materials by an addition reaction with a heterocyclic nitrogen compound of the formula

wherein D is selected from the class consisting of bivalent alkylene and mono-oxoalkylene radicals having from 1 to 3 carbon atoms in the bivalent chain and a total of from 1 to 7 carbon atoms and D' is selected from the class consisting of D and the bivalent carbonyl radical, and D and D' together with the nitrogen atoms to which they are attached complete a ring of from 5 to 6 members. Briefly, compounds of the above formula are, e.g., the 5-membered imidazolidines

or the 6-membered piperazines

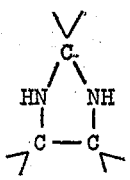

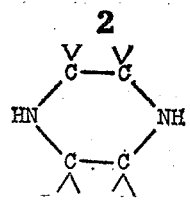

or the 6-membered hexahydropyrimidines

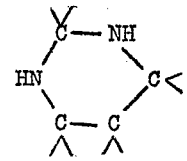

In either the imidazolidines or the piperazines or the hexahydropyrimidines, one or two of the ring carbon atoms may or may not be bivalently attached to oxygen, i.e., the compounds may or may not be cyclic ketones or diketones. For purposes of convenience, the presently useful heterocyclic nitrogen compounds will be hereinafter referred to simply as cyclic diimines.

Reaction of the cyclic diimines to give the presently provided addition polymers proceeds by addition of an imino group across an acetylenic bond of the diester, thus:

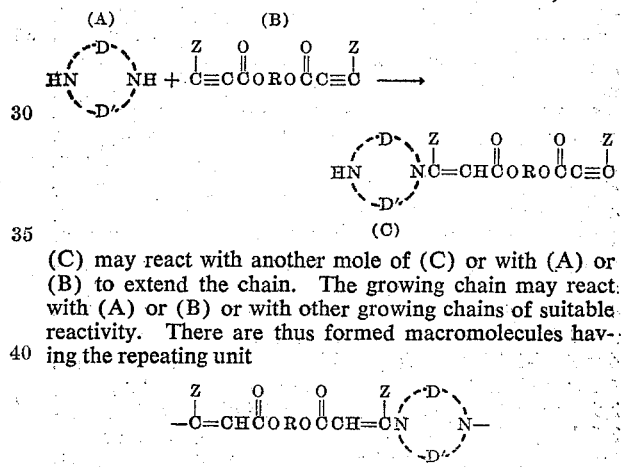

(C) may react with another mole of (C) or with (A) or (B) to extend the chain. The growing chain may react with (A) or (B) or with other growing chains of suitable reactivity. There are thus formed macromolecules having the repeating unit $$-\overset{Z}{\underset{|}{C}}{=}CH\overset{O}{\overset{\|}{C}}ORO\overset{O}{\overset{\|}{C}}CH{=}\overset{Z}{\underset{|}{C}}\overset{\nearrow\text{-}D\text{-}\searrow}{\underset{\searrow_{-D\text{-}}\nearrow}{N}}N-$$

Owing to the addition mechanism, the polymers are obtained without evolution of volatiles or other side-reaction products. As will be noted, the repeating unit is the addition product of one mole of the diester and one mole of the diimine. Hence, when the two reactants are employed in equimolar proportions and the reaction is carried to completion, there is obtained as product a high molecular weight polymer which is free not only of unreacted material but also of by-product.

A substantial portion of the diimine component of the reaction mixture can be replaced by a diol. While as much as, say, 95% of the diimine may be replaced by a diol, in practice, it is preferred to work with diimine-diol mixtures in which mixture the diimine is present in at least a 25% molar quantity. Using mixtures of diimine and diol there are obtained polymers containing nitrogen linkages derived from the cyclic diimine and ether linkages derived by addition of the diol across the acetylenic bonds of the ester, thus:

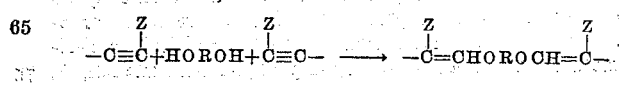

Polymers obtained from the dialkynoate and a mixture of diimine and a minor proportion of diol will thus have both the cyclic nitrogen linkages which are derived from the cyclic diimine and ether linkages which are derived from the diol. Conveniently, the diols which are useful in admixture with the diimines are those from which the acetylenic ester component is derived. The HOROH component will thus be characterized in connection with the following characterization of the useful acetylenic diesters.

Acetylenic diesters which are suitable for use in the present process are esters of dihydroxy compounds of the formula HO—R—OH where R is selected from the class consisting of bivalent hydrocarbon radicals and bivalent halohydrocarbon radicals of from 2 to 18 carbon atoms and is linked through diverse carbon atoms thereof to the two hydroxy groups, and of acetylenic carboxylic acids of the formula ZC≡CCOOH where Z is selected from the class consisting of hydrogen, alkyl radicals of from 1 to 5 carbon atoms and aryl radicals of 6 to 10 carbon atoms. As disclosed in the copending application of Miller and Butler referred to above, the diesters are prepared by esterification of the dihydroxy compound with either the free acetylenic acid or the acyl halide or anhydride thereof. Use of temperatures below 120° C. and operation in the presence of a diluent are recommended.

The dihydroxy compounds which are used for the preparation of the diesters that are employed in the present invention or in admixture with the diimine component may be aliphatic, cycloaliphatic, aromatic, or aliphatic-aromatic, and they may be saturated or unsaturated. Thus, as examples of dihydroxy compounds which give acetylenic diesters of present utility and which also may be used to replace up to 95% of the diimine are the aliphatic diols, e.g., ethylene glycol, 1,2- or 1,3- propanediol, 1,2-, 1,3-, 1,4- or 2,3-butanediol, 1,3-, 1,4-, 1,5-, 2,3-, or 2,4-pentanediol, 3-butene-1,2-diol, 2-butene-1,4-diol, 2-bromo-1,3-propanediol, 2-fluoro-1,3-propanediol, 2-butyne-1,4-diol, 2-methyl-1,5-pentanediol, 1,4-dichloro-2,3-butanediol, 2,3-dibromo-1,4-butanediol, 2- or 4-chloro-1,3-butanediol, 2,4-dimethyl-2,4-pentanediol, 1,1,1-trifluoro-2,3-butanediol, 2,2-diethyl-1,4-butanediol, 2-pentyn-1,4-diol, 2-pentene-1,5-diol, 2-propyl-1,3-butanediol, 2-chloro-1,5-pentanediol, 5-iodo-1,4-hexanediol, 1,4-hexanediol, 5-methyl-1,2-hexanediol, 2-ethyl-1,3-hexanediol, 2-tert-butyl-3,3,4,4-tetramethyl-1,2-pentanediol, 4-methyl-1,4-hexanediol, 1,6-hexanediol, 3,3-dimethyl-1,6-hexanediol, 2,4-dimethyl-3-hexene-2,5-diol, 2,3-, 2,4-, 2,5-, or 3,4-hexanediol, 1-chloro-2,5-dimethyl-3-hexyne-2,5-diol, 2,4-hexadiyne-1,6-diol, 1,6-, 1,7-, 2,4-, or 2,5-heptenediol, 2-heptene-1,6-diol, 1-chloro-2,5-dimethyl-3-heptyne-2,5-diol, 5-ethyl-3-methyl-2,4-heptanediol, 1,2-, 1,3-, 1,4-, 1,8-, 2,4-, 2,7-, or 4,5-octanediol, 2-methyl-2-octene-1,4-diol, 2,4,4,5,5,7-hexamethyl-3,6-octanediol, 2,7-dimethyl-4-octene-2,7-diol, 2-butyl-4-ethyl-3-methyl-1,3-octanediol, (3-heptafluoropropyl)-1,5-pentanediol, 1,9-nonanediol, 1,2- or 1,10-decanediol, 1,2- or 1,12-dodecanediol, 5-decyne-4,7-diol, 5,9-dimethyl-8-decene-1,5-diol, 5,8-diethyl-6,7-dodecanediol, 9-octadecene-1,12-diol, 9,10 or 1,12-octadecanediol, 1,9- or 1,11-undecanediol; 1,13-tridecanediol; 1,2-tetradecanediol, 1,2- or 1,16-hexadecanediol, 16-methyl-1,2-heptadecanediol, 1,2- or 1,12-octadecanediol, 2-methyl-1,2-propanediol, 2-butyl-2-ethyl-1,3-propanediol, 2,2-diethyl-1,3-propanediol, propanediol, 2-isobutyl-1,3-propanediol, 2-ethyl-1,3-butanediol, 2,2 - diethyl - 1,4-butanediol, 2,2,3,3-tetramethyl-1,4-butanediol, etc.

Examples of the benzenoid diols which are useful for esterification with the acetylenic acid, halide or anhydride to give presently useful diesters or which may be employed to replace part of the diimine are o, m, or p-xylene-α,α'-diols, 3,6-dimethyl-o-xylene-α,α'-diol, α,α'-dimethyl-p-xylene-α,α'-diol, 1,6-diphenyl-1,6-hexanediol, 1, 2-diphenyl-1,2-ethanediol, 1- or 2-phenyl-1,2-propanediol, 2-methyl-1-phenyl-1,2-propanediol, 2-di-o-tolylmethyl-1,3-propanediol, 2-methyl-3-phenyl-1,2-butanediol, 1, 4- or 2,2 - diphenyl-1,4-butanediol, 2,3-dimethyl-1,4-diphenyl-1,4-butanediol, 1,6- or 1,8-naphthalenedimethanol, α-, α'-mesitylenediol, o-benzenediethanol, α,α'-dimethylhydrobenzoin, 2,3 - dibenzylidene-1,4-butanediol, 1,1-bis-(p - bromophenyl) - 2-butyne-1,4-diol, 1-phenyl-1,5-pentane-diol, hydroquinone, resorcinol, 2,6-dichlororesorcinol, pyrocatechol, 4 - tert-butyl - 5-chloropyrocatechol, 4-dodecylpyrocatechol, p,p'-biphenol, 4,4'-dichloro-o,o'-biphenol, 2,2',6,6'-tetraisopropyl-p,p'-biphenol, 1,8 or 1,2-naphthalenediol; 2-bromo-3-methyl-1,4-naphalenediol, 4, 4'''-p-terphenyldiol, etc.

Alicyclic diols useful for the preparation of the presently employed acetylenic diesters and which also may be used to replace part of the diimine are, for example, cyclohexyl-1,2-ethanediol, 1-cyclohexyl-2-methyl-1-phenyl - 1,3 - propanediol, 5-cyclohexyl-2-methyl-2,3-pentanediol, 1,2-, 1,3- or 1,4-cyclohexanediol, 4-cyclopentyl-1,2-cyclohexanediol, 1,2-dimethyl-1,2-cyclohexanediol, 1,1-cyclopropanedimethanol, 1,2,2,3,5,5 - hexamethyl-1,3-cyclohexanediol, 2-cyclohexyl-1,4-cyclohexanediol, p,p'-bicyclohexanol, 1,1 or 1,2-cyclopentanedimethanol, 3,4-dichloro-1,2-cyclopentanediol, 3-cyclopentene-1,2-diol, 1,2-dimethyl - 1,2 - cyclopentanediol, decahydro-2,7-naphthalenediol, decahydro-2,3-napthalenedimethanol, (bicyclohexyl) - 1,1' - dimethanol, 4-cyclohexylresorcinol, 3,6-dibromo - 4-cyclohexane-1,2-diol, 4,5-dimethyl-4-cyclohexene-1,2-dimethanol, etc.

The acetylenic acids which are reacted with the polyols to give the presently useful acetylenic diesters may be 1-alkynoic acids of from 3 to 8 carbon atoms or arylpropiolic acids of from 9 to 13 carbon atoms. Acyl halides or anhydrides of such acetylenic acids may be used instead of the acids. The following are some examples of acetylenic acid compounds which are reacted with the above described diols to give esters of use in the present invention: propiolic acid, propiolyl chloride, bromide, iodide or fluoride, propiolic anhydride, tetrolic acid, 2-pentynoic acid, 2-hexynoic acid, 2-heptynoic acid, 2-octynoic acid, 2-octynoyl chloride, trimethyltetrolic acid, phenylpropiolic acid, phenylpropiolyl chloride, 2,3,4,6-tetramethylphenylpropiolic acid, o-, m- or p-tolylpropiolic acid, 1-naphthalenepropiolic acid, p-phenylphenylpropiolic acid, etc.

The propiolyl halide which may be used as one of the reactants of the esterification reaction may be prepared by reacting propiolic acid with benzoyl halide, as disclosed in the copending application of Lee A. Miller, Serial No. 6,344, filed February 3, 1960. The propiolyl chloride so formed may be led directly, without intermediate recovery, into a solution or suspension of the diol which is to be esterified for preparation of the presently employed acetylenic diesters.

Some examples of the acetylenic diesters which are useful for the preparation of the presently provided high molecular weight polymers are given below:

2-butene-1,4-diol dipropiolate
Ethylene glycol ditetrolate
2,3-dimethyl-1,3-pentanediol di-2-pentynoate
Propylene glycol dipropiolate
2-methyl-1,5-pentanediol bis(phenylpropiolate)
2-heptene-1,6-diol dipropiolate
1,6-dimethyl-1,2-heptadecanediol di-2-pentynoate
Hydroquinone dipropiolate
o-Benzenediethanol bis(phenylpropiolate)
1-phenyl-1,2-propanediol dipropiolate
4,4'-dichloro-o,o'-biphenol dipropiolate
p,p'-Dicyclohexanol dipropiolate
1,2-cyclopentanediol bis(phenylpropiolate)
4-cyclohexene-1,2-dimethanol di-2-pentynoate
1,1-cyclopropanedimethanol dipropiolate
Cyclohexane-1,2-ethanediol bis(phenylpropiolate)

3-cyclopentene-1,2-diol bis(1-naphthalenepropiolate)
Decahydro-2,3-naphthalenedimethanol dipropiolate
2-methyl-1,2-propanediol dipropiolate
2-methyl-2-octene-1,4-diol dipropiolate
1,6-hexanediol bis(4-tolylpropiolate)

The cyclic diimines which are used with the above described acetylenic diesters to give the presently provided polymers have the formula

wherein D is selected from the class consisting of bivalent alkylene and oxoalkylene radicals having from 1 to 2 carbon atoms in the chain and a total of from 1 to 7 carbon atoms and D' is selected from the class consisting of D and the bivalent carbonyl radical, and D and D' together with the nitrogen atoms to which they are attached complete a ring of from 5 to 6 members.

One class of cyclic diimines having the above formula and useful for the preparation of the present addition polymers comprises piperazines of the formula

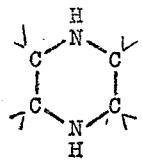

wherein any of the dangling valences may be satisfied with hydrogen or an alkyl radical of from 1 to 5 carbon atoms so long as the total number of carbon atoms in the entire compound is not more than 14 and wherein from one to two of the ring carbon atoms may be attached to oxygen through the two dangling valences of the carbon atom. Examples of such piperazine compounds are piperazine, 2-piperazinone, 2,5-piperazinedione, 2-methylpiperazine, 2,5-diethylpiperazine, 2,3-diisopropylpiperazine, 2,2-dimethylpiperazine, 2-butylpiperazine, 2,3-diamylpiperazine, 3-isobutyl-3-isopropyl-2,5-piperazinedione, 3,6-diisoamyl-2,5-piperazinedione, 3-methyl-2,5-piperazinedione, 3,3-dimethyl-2-piperazinone, 3-ethyl-2-piperazinone, etc.

Another class of cyclic diimines which are useful for the present purpose are the imidazolidines, i.e., compounds of the formula

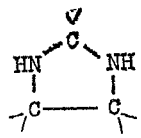

wherein the dangling valences are satisfied as in the above described piperazine compounds. This includes, e.g., 2-methylimidazolidine, 2,4,5-triethylimidazolidine, 2-imidazolidinone, 4-methylimidazolidinone, 4-butyl-4-ethyl-2-imidazolidinone, 4-ethyl-5-methyl-2-imidazolidinone, 4,5-dimethyl-2-imidazolidinone, hydantoin (2,4-imidazolidinedione), 5-butyl-5-ethylhydantoin, 5,5-dimethylhydantoin, 5-methylhydantoin, 5-methyl-5-pentylhydantoin, 5-amylhydantoin, etc.

Another class of presently useful compounds comprises the hexahydropyrimidine compounds, e.g., 1,3-dimethylhexahydropyrimidine, 2-oxohexahydropyrimidine (trimethylene urea), 2-oxo-4-methylhexahydropyrimidine (α-methyltrimethylene urea), 2-oxo-5-ethylhexahydropyrimidine (β-ethyltrimethylene urea), hydrouracil, 5-methylhydrouracil, 5,6-diethylhydrouracil, etc.

Reaction of the acetylenic diester with the cylic diimine or a mixture consisting of at least 50% of the diimine with the balance being a diol is generally conducted in the presence of a basic catalyst and in the presence of an inert liquid diluent or solvent. Examples of suitable diluents are dioxane, benzene, xylene, hexane, acetone, carbon tetrachloride, tert-butanol, etc. Preferably, the basic catalyst is organic. This is particularly desirable when the reaction is effected in the presence of a diluent. Examples of presently useful basic catalysts are, e.g., the heterocyclic nitrogen bases such as N-methylmorpholine, pyridine, quinoline, N-ethylpiperidine, picoline, quinaldine, 4-methylpyrimidine, or N-ethylpyrazole; the tertiary amines such as triethylamine, triamylamine, tritert-butylamine, N,N-dimethylaniline and N-benzyl-N-methylaniline; alkylene polyamines such as triethylenediamine; quaternary ammonium compounds such as benzyltrimethylammonium methoxide or tetrabutylammonium butoxide; alkali metal alkoxides such as sodium or potassium methoxide or propoxide, etc. The use of a diluent or solvent in the reaction will depend upon the nature of the reactants as well as upon the reaction conditions which are employed. When using a solid acetylenic diester it is generally recommended that a diluent be employed; on the other hand, when the acetylenic diester is liquid at the reaction temperature a diluent need not be used unless the ester and/or the diimine are extremely reactive. In that case, the use of an inert diluent will serve to moderate the reaction. The quantity of the catalyst to be used also depends upon the nature of the acetylenic ester and of the diimine and of the diol, if present; obviously the more reactive reactants will require less catalyst than will the more sluggish reactants. Whether or not a diluent is used will likewise regulate catalyst quantity. Also variable is the temperature at which reaction is effected; for here again must be taken into consideration the nature of the reactants, catalyst quantity, and whether or not a diluent is used. While some of the present addition polymerizations can be conducted at ordinary room temperature or even at decreased temperatures, say, −10° C. to 10° C., in other instances heating of the reaction mixture will be needed. All of these variables, i.e., catalyst quantity, use of diluent and temperature conditions can readily be arrived at by easy experimentation. Since reaction is evidenced by evolution of heat and a change in viscosity, whether or not one or both of such phenomena occur will be indicative of reaction. Very rapid reaction at room temperature, as evidenced by rapid temperature rise will show the need for a diluent, and/or lower temperature and/or less catalyst. Conversely, no reaction or only a very slow reaction at room temperature will indicate the use of more extreme conditions, i.e., extraneous heating and/or no diluent and/or more catalyst. Thus, arrival at optimum reaction conditions is simply a matter of routine procedure by one skilled in the art. To assure complete reaction in experimental runs it is generally recommended that the reaction mixture be allowed to stand for some time after the primary, generally exothermic reaction has subsided. Completion of the reaction can then be ascertained by simply noting cessation in change of viscosity.

When the addition polymerization has been effected in the absence of a solvent or diluent, generally no further treatment of the product is required previous to its use, say, as a plasticizer, molding resin, or impregnant. When the reaction is effected in the presence of a diluent which is a non-solvent for the polymer, the precipitated resinous product is simply filtered off, washed and dried. When the reaction is conducted in a liquid which is a solvent for the addition polymer, the latter is separated from the reaction mixture by mixing with a liquid which is a non-solvent for the polymer. The precipitate or coagulate thus formed consists essentially of the polymer. The coagulates are then filtered off and washed and dried to give the resinous polymer. However, solutions of the addition polymer need not be coagulated to give useful products; for many purposes the solutions per se may be used directly, e.g., as bonding adhesives and as impregnating agents. The solutions may also be used for conversion of the soluble, linear polymer content thereof into insoluble, cross-linked resins.

To recapitulate: In the preparation of the present addition polymers, the acetylenic diester is reacted with the the cyclic diimine or with a mixture of the diimine and diol in the presence of a basic catalyst and in the presence or absence of an inert diluent or solvent at a temperature which may be as low as, say, —10° C. and as high as, say, 125° C. and the resulting mixture is allowed to stand until a very high molecular weight polymer is achieved. The acetylenic ester and the diimine or mixture of diimine and diol are employed in substantially stoichiometric proportions. Depending upon the individual reactants and catalyst and upon whether or not a diluent is used, extraneous heating may or may not be employed; but when it is used, the mixture is heated up gradually, say, at a rate of 1 to 5° C. per minute to a temperature which may be up to 125° C. but is more generally from 70° C. to 90° C. Also, depending upon the nature of the individual reactants, the quantities thereof and the reaction conditions, completion of the reaction as noted by no further change in viscosity, is obtained within a time that will range from, say, a few minutes to several days. Whether or not a linear polymer is obtained and the molecular weight of the polymer will depend to some extent on the proportion of reactants employed. The high molecular weight, linear polymers are generally obtained when the cyclic diimine or mixture of diimine and diol and the acetylenic ester are used in substantially equimolar proportions. A substantial excess of the diimine may result in cross-linking of the initially formed linear polymer by addition of the diimine across the olefinic double bonds of the linear polymer.

Alternative procedures may involve the use of a mixture of two or more acetylenic esters, for example, a mixture of the dipropiolate of ethylene glycol and the bis(phenylpropiolate) of 4,4'-isopropylidenediphenol. Likewise there may be used a mixture of diimines or a mixture consisting predominantly of one or more diimines and a minor proportion of one or more diols to obtain polymers having various linkages dispersed more or less randomly in the polymer chain.

The presently provided linear polymers range from clear, viscous liquids to transparent solids. The viscous liquid polymers can be reacted with polyfunctional compounds to give cross-linked or cured products to give high melting, solvent-resistant resins. Of particular importance, however, are those of the presently provided linear polymers which are solid resinous materials. Such products are readily compression molded with heating to give molded objects which are tough, transparent and of good dimensional stability. The polymers may also be cast into films from solutions thereof or fibers may be prepared therefrom by extruding through a suitable orifice into a precipitating bath. Solutions of the solid polymers or the viscous polymers which are obtainable under some conditions by incomplete polymerization are useful as impregnating agents and adhesives in the manufacture of laminates. Either the solid or viscous polymers are also advantageously employed in resinous base coatings, i.e., paints, varnishes, lacquers and enamels. The viscous polymers or solutions of the linear polymers are also useful in the manufacture of tiles, linoleums, wallboards, etc. by mixing them with comminuted matter, such as ground cork, wood flour, asbestos, mineral fillers or the like and either completing the polymerization or evaporating the solvent or diluent. The cross-linked gels as well as the presently provided viscous polymers are likewise useful as potting compounds and sealants. An especially interesting utility of the present polymers, particularly of the gels, is in the formulation of solid or semi-solid propellant fuels for rockets and other guided missiles.

Those of the linear polymers which are not solid, resinous materials can be treated with a curing or cross-linking agent to give tough, substantially infusible and insoluble products. Thus, they can be cured with sulfur or other vulcanizing agents, e.g., para-quinone dioxime or para-dinitrosobenzine to give rubbers.

Compounds reactive under curing conditions with the presently provided linear polymers to give tough, cross-linked resins are, for example, compounds containing a vinyl ($CH_2$:CH—) radical and copolymerizable with the linear polyesters such as styrene, vinyl acetate, vinyl chloride and methyl vinyl ketone; alkenyl esters of $\alpha,\beta$-unsaturated dicarboxy acids such as allyl fumarate or maleate, etc.

The cross-linked polymers obtained by heating the presently provided linear polymers with a mono-vinyl aromatic compound or mixtures of such compounds under curing conditions, e.g., in the presence of a catalyst of polymerization, are of exceptional interest in that they comprise valuable resinous materials of high utility in the preparation of moldings, castings, laminates and surface-coatings. Presently useful polymerization catalysts are, e.g., peroxidic compounds such as benzoyl peroxide, tert-butyl hydroperoxide, cumene hydroperoxide, or potassium persulfate or azo compounds such as $\alpha,\alpha'$-azobisisobutyronitrile, etc. Castings formed from such cross-linked polymers are transparent, substantially colorless, tough products which are characterized by good dimentional stability and resistance to heat and moisture. Monovinyl aromatic compounds useful for the preparation of the cross-linked polymers are compounds in which one vinyl group is attached to a carbon atom of a benzene, biphenyl, naphthalene, fluorene or acenaphthene ring structure. The ring may contain other substituents such as chlorine, fluorine, alkoxy, alkyl, hydroxy, trichloromethyl, trifluoromethyl or acetyl. The vinyl group may or may not be substituted. As illustrative of compounds included within the scope of monovinyl aromatic compounds may be mentioned styrene, $\alpha$-methylstyrene, 3,4-dichlorostyrene, 4-fluorostyrene, $\alpha$-chlorostyrene, 4-vinyltoluene, 3-(trifluoromethyl)styrene, 4-vinylanisole, 4-vinylacetophenone, $\alpha$-vinylnaphthalene, 4-vinylbiphenyl, 3-vinylfluorene, 2-vinylacenaphthene, etc.

The invention is further illustrated by, but not limited to, the following examples:

*Example 1*

To a mixture consisting of 3.6525 g. (0.016 mole) of 4,4'-isopropylidenediphenol, 0.7769 g. (0.004 mole) of piperazine hexahydrate, 0.0112 g. of triethylenediamine and 20 ml. of sodium-purified dioxane there was added during 15 minutes, via a dropping funnel and with ice-bath cooling, 4.1642 (0.020 mole) of the dipropiolate of 2,2-dimethyl-1,3-propanediol dissolved in 18 ml. dioxane and using an additional 5 ml. of dioxane for rinsing the dropping funnel. When all of the dipropiolate had been added, the temperature of the reaction mixture was 14° C. About 24 minutes later the exothermic reaction reached a peak of 36° C., and by this time all of the solids had dissolved. About 18 minutes later the temperature had dropped to 31° C. and the reaction mixture, which was now somewhat viscous was heated with a mantle to a temperature of 60–61° C. and maintained at this temperature to give a total reaction time (from initiation of the dipropiolate introduction) of three hours.

The resulting viscous reaction mixture was coagulated in 1 liter of water which had been acidified with 1 ml. of concentrated hydrochloric acid. The coagulate was broken up in the Warning Blendor, filtered, washed alternately with water and methanol several times, and dried at 75° C. for 3 hours and at 60° C. for 6 hours. An 0.2% m-cresol solution of the dried, solid copolymer thus obtained had an intrinsic viscosity of 0.685. At 255° C. it was drawn into amber, tough fibers. Compression molding at 170° C. gave a very light yellow, clear and transparent molded piece. Evaluation by the Clash-Berg method gave $T_f$ 61.5° C., $T_{2000}$ 78° C. and 25° C. modulus of 380,000. The molded copolymer was found to have a tensile strength of 8130 p.s.i. at yield and 6700 p.s.i. at break and an elongation of 6% at yield and 168% at break.

In the above experiment the ratio of the phenol to the piperazine was 4:1. The experiment was then substantially repeated in two other runs wherein there was used either a 3:2 or 2:3 ratio of the 4,4′-isopropylidenediphenol to the piperazine hexahydrate instead of the 4:1 ratio. For convenience, evaluation data obtained on the copolymers which were obtained by using the three different 4,4′-isopropylidenediphenol-piperazine ratios are summarized below:

|  | 4:1 | 3:2 | 2:3 |
|---|---|---|---|
| $\eta_i$, m cresol | 0.685 | 0.40 | 0.365 |
| $T_f$, °C | 61.5 | 66 | 80 |
| $T_{2000}$, °C | 78 | 92.5 | 107 |
| Mod./25° C., p.s.i. | 380,000 | 400,000 | 400,000 |
| Tensile Strength, p.s.i.: |  |  |  |
| Yield | 8,130 |  | 8,890 |
| Break | 6,700 | 3,333 | 6,305 |

*Example 2*

A 200 ml. flask fitted with a nitrogen purge, reflux condenser and oil trap, thermometer, mechanical stirrer, and dropping funnel was charged with 5.8269 g. (0.0300 mole) of piperazine hexahydrate and 30 ml. of dry dioxane. The mixture was cooled briefly in an ice bath and then during 10 minutes there was added via the dropping funnel 6.2463 g. (0.0300 mole) of the dipropiolate of 2,2-dimethyl-1,3-propanediol dissolved in 15 ml. of dioxane. In order to be certain that all of the dipropiolate had been introduced, the funnel was rinsed with 5 ml. of dioxane and the rinse was introduced into the reaction mixture. The reaction mixture was stirred for about 1.5 hours with occasional cooling. At the end of this time the temperature of the reaction mixture was 24° C. Mantle heating was then employed and the reaction mixture was maintained at up to 58° C. for 45 minutes. The resulting translucent, slushy reaction mixture was taken up in water and filtered; and the fine, amorphous solids were washed first with water and then with methanol. A small amount of coagulate formed in the methanol filtrate. This was filtered off and washed with water and added to the washed solids. Vacuum drying of the combined solids at 70–75° C. for 4 hours gave 8.78 g. (99.5% theoretical yield) of the almost white, solid linear polyester which was insoluble in cold dimethylformamide, dimethyl sulfoxide, cyclohexanone, and Celloslove and was swollen by acetic acid. It was soluble in cold m-cresol and in hot dimethylformamide and in hot acetic acid. An 0.2% m-cresol solution of the polymer had an intrinsic viscosity of 0.86. It was compression molded at 265° C. to give tough, rigid, molded pieces.

*Example 3*

To a mixture consisting of 1.1410 g. (0.01 mole) of 2,5-piperazinedione, 2.0821 g. (0.01 mole) of the dipropiolate of 2,2-dimethyl-1,3-propanediol and 7.8 ml. of dioxane there was added 0.2 ml. of a catalyst solution prepared by diluting 0.2243 g. of triethylenediamine to 10 ml. with pure dioxane. One minute after addition of the catalyst the originally somewhat mushy reaction mass turned to a dark red-brown solution. It was allowed to stand at 80° C. for 24 hours to give the highly viscous addition polymer of the piperazinedione and the diol.

*Example 4*

To a mixture consisting of 1.2914 g. (0.015 mole) of 2-imidazolidinone, 3.1232 g. of the dipropiolate of 2,2-dimethyl-1,3-propanediol and 15 ml. of dioxane there was added 0.50 ml. of a catalyst solution which had been prepared by diluting 0.1680 g. of triethylene diamine to 10 ml. with dioxane. The temperature of the reaction mixture rose from the initial 26° C. to 34° C. within 17 minutes. The mixture was then heated to a temperature of 100° C. within 30 minutes. The reaction mixture was then cooled and coagulated in 100 ml. of water. The almost colorless, flocculent precipitate which formed was filtered off, and washed first with water and then with methanol. Vacuum drying of the washed solids at 85° C. gave the light cream dipropiolate-2-imidazolidinone addition polymer which was insoluble in the usual solvents and only swollen by hot or cold m-cresol of N-methylpyrrollidone.

*Example 5*

A mixture consisting of 0.6457 g. (0.0075 mole) of 2-imidazolidinone, 1.7121 g. (0.0075 mole) of 4,4′-isopropylidenediphenol, 3.1232 g. (0.015 mole) of the dipropiolate of 2,2-dimethyl-1,3-propanediol, 20 ml. of dioxane and 0.2 ml. of a catalyst solution which had been prepared by diluting 0.1680 g. of triethylene diamine to 10 ml. with dioxane was stirred with water-bath cooling and under nitrogen for 35 minutes. During this time the temperature of the reaction mixture rose from an initial 15.5° C. to a peak of 40° C. and decreased to 32.5° C. Mantle heating was then applied and stirring was continued for another 40 minutes at a temperature of up to 60° C. The resulting viscous solution was coagulated in 200 ml. of water, broken up in a Waring Blendor, and the solids filtered off and washed first with water and then with methanol. Upon vacuum drying of the washed solids at 85° C. there was obtained the almost white addition polymer which was insoluble in cold cyclohexanone, soluble in hot cyclohexanone and soluble in cold m-cresol. An 0.2% solution of the polymer in m-cresol had a specific viscosity of 0.158 at 25° C.

*Example 6*

A mixture consisting of 0.6457 g. of 2-imidazolidinone, an equimolar quantity of 2,2-dimethyl-1,3-propanediol (0.7811 g.), 3.1232 g. (0.015 mole) of the dipropiolate of 2,2-dimethyl-1,3-propanediol, 20 ml. of dioxane and 0.5 ml. of a catalyst solution consisting of 0.168 g. of triethylene diamine diluted to 10 ml. with dioxane was stirred, with water-bath cooling, for 31 minutes during which time the temperature of the reaction mixture rose from 18° C. to 25.5° C. The water-bath was then removed and the mixture stirred for an additional 30 minutes. At this point the temperature of the reaction was 38.2° C. Mantle heating was then applied and the reaction mixture was stirred at a temperature of 60° C. for 2 hours. The reaction mixture was coagulated with water, the solids were filtered off and washed first with water and then with methanol, and the washed product was vacuum dried at 85° C. The addition polymer thus obtained was soluble in m-cresol, an 0.2% solution of the polymer in m-cresol having an specific viscosity of 0.037 at 25° C.

What we claim is:

1. A resinous composition comprising the addition polymer of an acetylenic diester of the formula

in which Z is selected from the class consisting of hydrogen, alkyl radicals of from 1 to 5 carbon atoms and aryl radicals of 6 to 10 carbon atoms and R is selected from the class consisting of bivalent hydrocarbon radicals of from 2 to 18 carbon atoms and such radicals carrying halogen substitution and is linked through diverse carbon atoms thereof to the remainder of the molecule of which it forms a part, and a heterocyclic nitrogen compound of the formula

wherein D is selected from the class consisting of bivalent alkylene and mono-oxoalkylene radicals having from 1 to 3 carbon atoms in the bivalent chain and a total of from 1 to 7 carbon atoms, and D' is selected from the class consisting of D and the bivalent carbonyl radical, and D and D' together with the nitrogen atoms to which they are attached complete a ring of from 5 to 6 members, said polymer having been prepared by contacting the diester with the nitrogen compound in the presence of a basic catalyst.

2. A resinous composition comprising the addition polymer of an acetylenic diester of the formula

in which Z is selected from the class consisting of hydrogen, alkyl radicals of from 1 to 5 carbon atoms and aryl radicals of 6 to 10 carbon atoms and R is selected from the class consisting of bivalent hydrocarbon radicals of from 2 to 18 carbon atoms and such radicals carrying halogen substitution and is linked through diverse carbon atoms thereof to the remainder of the molecule of which it forms a part, and a mixture consisting of (1) a heterocyclic nitrogen compound of the formula

wherein D is selected from the class consisting of bivalent alkylene and mono-oxoalkylene radicals having from 1 to 3 carbon atoms in the bivalent chain and a total of from 1 to 7 carbon atoms, and D' is selected from the class consisting of D and the bivalent carbonyl radical, and D and D' together with the nitrogen atoms to which they are attached complete a ring of from 5 to 6 members, with the balance of said mixture being (2) a diol of the formula HOROH wherein R is as defined above, said polymer having been prepared by contacting the diester with said mixture in the present of a basic catalyst.

3. A resinous composition comprising the addition polymer of the dipropiolate of a hydrocarbon diol wherein the two hydroxy radicals are attached to diverse carbon atoms of a hydrocarbon radical having from 2 to 18 carbon atoms and a heterocyclic nitrogen compound of the formula

wherein D is selected from the class consisting of bivalent alkylene and mono-oxoalkylene radicals having from 1 to 3 carbon atoms in the bivalent chain and a total of from 1 to 7 carbon atoms, and D' is selected from the class consisting of D and the bivalent carbonyl radical, and D and D' together with the nitrogen atoms to which they are attached complete a ring of from 5 to 6 members, said polymer having been prepared by contacting the dipropiolate with a substantially equimolar proportion of the nitrogen compound in the presence of a basic catalyst.

4. A resinous composition comprising the addition polymer of the dipropiolate of a hydrocarbon diol wherein two hydroxy radicals are attached to diverse carbon atoms of a hydrocarbon radical having from 2 to 18 carbon atoms and a mixture consisting of (1) a heterocyclic nitrogen compound of the formula

wherein D is selected from the class consisting of bivalent alkylene and mono-oxoalkylene radicals having from 1 to 3 carbon atoms in the bivalent chain and a total of from 1 to 7 carbon atoms, and D' is selected from the class consisting of D and the bivalent carbonyl radical, and D and D' together with the nitrogen atoms to which they are attached complete a ring of from 5 to 6 members with the balance of said mixture being (2) a hydrocarbon diol wherein the two hydroxy radicals are attached to diverse carbon atoms of a hydrocarbon radical having from 2 to 18 carbon atoms, said polymer having been prepared by contacting a substantially equimolar proportion of the dipropiolate with said mixture in the presence of a basic catalyst.

5. A resinous composition comprising the addition polymer of piperazine and the dipropiolate of an alkylene glycol of from 2 to 18 carbon atoms, said polymer having been prepared by heating the dipropiolate with a substantially equimolar proportion of piperazine in the presence of a basic catalyst and an inert diluent at a temperature of up to 125° C.

6. A resinous composition comprising the addition polymer of piperazinedione and the dipropiolate of an alkylene glycol of from 2 to 18 carbon atoms, said polymer having been prepared by heating the dipropiolate with a substantially equimolar proportion of piperazinedione in the presence of a basic catalyst and an inert diluent at a temperature of up to 125° C.

7. A resinous composition comprising the addition polymer of 2-imidazolidinone and the dipropiolate of an alkylene glycol of from 2 to 18 carbon atoms, said polymer having been prepared by heating the dipropiolate with a substantially equimolar proportion of 2-imidazolidinone in the presence of a basic catalyst and an inert diluent at a temperature of up to 125° C.

8. A resinous composition comprising the addition polymer of piperazine and the dipropiolate of 4,4'-isopropylidenediphenol, said polymer having been prepared by heating the dipropiolate with a substantially equimolar proportion of piperazine in the presence of a basic catalyst and an inert diluent at a temperature of up to 125° C.

9. A resinous composition comprising the addition polymer of piperazine and the dipropiolate of 2,2-dimethyl-1,3-propanediol, said polymer having been prepared by heating the dipropiolate with a substantially equimolar proportion of piperazine in the presence of a basic catalyst and an inert diluent at a temperature of up to 125° C.

10. A resinous composition comprising the addition polymer of 2,5-piperazinedione and the dipropiolate of 2,2-dimethyl-1,3-propanediol, said polymer having been prepared by heating the dipropiolate with a substantially equimolar proportion of 2,5-piperazinedione in the presence of a basic catalyst and an inert diluent at a temperature of up to 125° C.

11. A resinous composition comprising the addition polymer of 2-imidazolidinone and the dipropiolate of 2,2-dimethyl-1,3-propanediol, said polymer having been prepared by heating the dipropiolate with a substantially equimolar proportion of 2-imidazolidinone in the presence of a basic catalyst and an inert diluent at a temperature of up to 125° C.

12. A resinous composition comprising the addition polymer of the dipropiolate of 2,2-dimethyl-1,3-propanediol and a substantially equimolar mixture of 2-imidazolidinone and 2,2-dimethyl-1,3-propanediol, said polymer having been prepared by heating the dipropiolate with said mixture in the presence of a basic catalyst and an inert diluent at a temperature of up to 125° C.

13. The method of preparing a resinous composition which comprises contacting, in the presence of a basic catalyst, an acetylenic ester of the formula

in which Z in selected from the class consisting of hydrogen, alkyl radicals of from 1 to 5 carbon atoms and aryl radicals of 6 to 10 carbon atoms and R is selected from the class consisting of bivalent hydrocarbon radicals of from 2 to 18 carbon atoms and such radicals carrying halogen substitution, with a heterocyclic nitrogen compound of the formula

wherein D is selected from the class consisting of bivalent alkylene and mono-oxoalkylene radicals having from 1 to 3 carbon atoms in the bivalent chain and a total of from 1 to 7 carbon atoms and D' is selected from the class consisting of D and the bivalent carbonyl radical and D and D' together with the nitrogen atoms to which they are attached complete a ring of from 5 to 6 members.

14. The process of preparing a resinous composition which comprises contacting, at a temperature of from —10° C. to 125° C. and in the presence of a basic catalyst and an inert liquid diluent, the dipropiolate of a hydrocarbon diol wherein the two hydroxy groups are attached to diverse carbon atoms of a hydrocarbon radical having from 2 to 18 carbon atoms and a mixture consisting of at least 50 mole percent of a heterocyclic nitrogen compound of the formula

wherein D is selected from the class consisting of bivalent alkylene and mono-oxoalkylene radicals having from 1 to 3 carbon atoms in the bivalent chain and a total of from 1 to 7 carbon atoms and D' is selected from the class consisting of D and the bivalent carbonyl radical and D and D' together with the nitrogen atoms to which they are attached complete a ring of from 5 to 6 members, with the balance of said mixture being said hydrocarbon diol.

15. The process of preparing a resinous composition which comprises contacting piperazine with a substantially equimolar proportion of the dipropiolate of a hydrocarbon diol of from 2 to 18 carbon atoms at a temperature of from —10° C. to 125° C. and in the presence of a basic catalyst and an inert liquid diluent.

16. The process of preparing a resinous composition which comprises contacting piperazine with a substantially equimolar proportion of the dipropiolate of 2,2-dimethyl-1,3-propanediol at a temperature of from — 10° C. to 125° C. and in the presence of a basic catalyst and an inert liquid diluent.

17. The process of preparing a resinous composition which comprises contacting piperazine with a substantially equimolar proportion of the dipropiolate of 4,4'-isopropylidenediphenol at a temperature of from —10° C. to 125° C. and in the presence of a basic catalyst and an inert liquid diluent.

18. The process of preparing a resinous composition which comprises contacting 2,5-piperazinedione with a substantially equimolar proportion of the dipropiolate of 2,2-dimethyl-1,3-propanediol at a temperature of from —10° C. to 125° C. and in the presence of a basic catalyst and an inert liquid diluent.

19. The process of preparing a resinous composition which comprises contacting 2-imidazolidinone with a substantially equimolar proportion of the dipropiolate of 2,2-dimethyl-1,3-propanediol at a temperature of from —10° C. to 125° C. and in the presence of a basic catalyst and an inert liquid diluent.

20. A tough, cross-linked synthetic resinous product prepared by heating the addition polymer of claim 14 with a compound containing a vinyl radical and copolymerizable with said addition polymer in the presence of a catalyst of polymerization.

21. A tough, cross-linked synthetic resinous product prepared by heating the addition polymer of claim 15 with a compound containing a vinyl radical and copolymerizable with said addition polymer in the presence of a catalyst of polymerization.

References Cited in the file of this patent

UNITED STATES PATENTS 2,318,959    Muskat _____ May 11, 1943